Sept. 10, 1957
H. SEIDL
2,805,650
CYCLONE COMBUSTION APPARATUS
Filed May 23, 1955
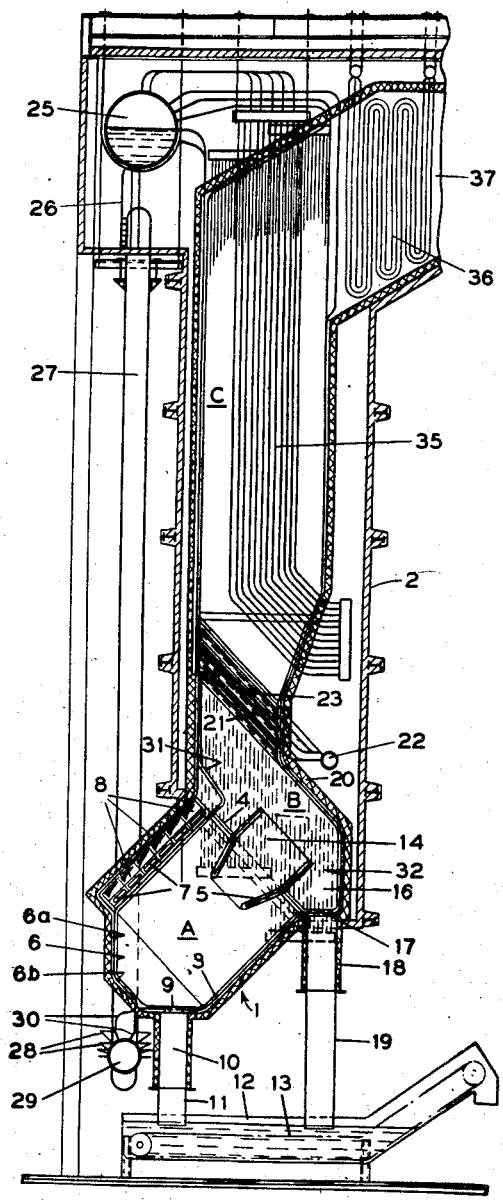
INVENTOR.
HERBERT SEIDL
BY
ATTORNEY United States Patent Office 2,805,650
Patented Sept. 10, 1957

2,805,650

CYCLONE COMBUSTION APPARATUS

Herbert Seidl, Oberhausen, Rhineland, Germany, assignor to The Babcock & Wilcox Company, New York, N. Y., a corporation of New Jersey Application May 23, 1955, Serial No. 510,356

4 Claims. (Cl. 122—235)

The invention relates to combustion apparatus which incorporates a cyclone furnace, or more than one such furnace, of the kind in which a cooled chamber of circular or substantially circular cross-section is adapted to be fed tangentially or substantially tangentially with an ash-bearing fuel and with combustion air and to operate with removal of ash in molten form; the chamber having one end wall formed with a gas outlet adapted for the axial discharge of gaseous products of combustion from the chamber, and having an opposite end wall which, at the side toward the chamber, is formed as the curved surface of a conical frustum which is coaxial with the chamber.

Such cyclone furnaces can be arranged to effect a very complete burning-out of the fuel with a high rate of heat release in the furnace chamber and with a high degree of slag separation. They are, however, sensitive to irregularities in the fuel and air supply, whether caused by change in load or in the properties of the fuel or by operational errors. As a result of the high rate of heat absorption in the furnace chamber, even a brief drop below the slag melting temperature tends to cause serious overcooling of the slag which has an unfavorable effect on the flow of the slag.

It is well known to dispose a cyclone furnace with its longitudinal axis either substantially horizontal or substantially vertical, and each of these dispositions has its advantages and its disadvantages.

Thus it is known to arrange a cyclone furnace with its axis approximately horizontal and with its slag outlet in the end wall through which the hot gaseous products of combustion are discharged. Overcooling of the slag may result in freezing-up of the slag outlet and a consequent accumulation within the cyclone furnace chamber of a pool or mass of viscous slag which extends along the entire length of the furnace chamber and disturbs the gas flow through the chamber, which disturbance tends to lead to incomplete combustion of the fuel and so to a further drop in the temperature of the gases. A further disadvantage of the horizontally arranged cyclone furnace is that as the burning fuel spins inside the circular chamber, it suffers a periodic acceleration and retardation as its falls on one side of the axis and rises on the other side, due to gravitational effects.

If a cyclone furnace is arranged with its axis perpendicular, both the difficulty of the cross-section being rendered non-circular by slag accumulations and the periodic acceleration and retardation of the fuel stream are avoided but, owing to the force of gravity, if the cyclone furnace is arranged to discharge hot gaseous products of combustion downwardly, there is a tendency for incompletely burnt fuel to be carried out with the gases, while if the furnace gases leave upwardly, there is a tendency for incompletely burnt fuel to leave the cyclone chamber with the slag from the lower end of the chamber.

In accordance with the present invention, non-fluid slag accumulations within a cyclone combustion chamber are substantially avoided by arranging the chamber with its longitudinal axis steeply inclined and by providing for the axial discharge of gaseous products of combustion from its upper end, with slag being discharged from an opposite end region through an opening formed in a peripheral wall portion at the bottom.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which a selected embodiment of the invention has been illustrated and described.

As diagrammatically indicated in the drawing, a cyclone furnace 1 is structurally embodied in a vapor generating unit 2 so as to constitute the sole heating means therefor. In more detail, the cyclone furnace 1 includes a substantially cylindrical combustion chamber A, of generally circular cross section throughout, which is bounded by a peripheral wall 3 and arranged with its axis at an inclination of 45° to the horizontal, the upper, inner end of furnace chamber A being bounded by a flat end wall 4 in the center of which is disposed a sleeve 5 arranged radially inwardly from the wall 3 and forming an outlet for the flow of hot products of combustion from the chamber, and the opposite lower end of which is bounded by a wall 6 comprising a part 6a next to the wall 3 and in the form of the curved surface of the frustum of a cone coaxial with the chamber A, and a flat central wall part 6b. The apex angle of the cone of the wall part 6a is 90°, so that the angle of inclination of the axis of the cylindrical part of the chamber A to the horizontal is equal to 45° which is half the apex angle of the frusto-conical curved surface. The walls of the cyclone furnace are constructed in known manner with fluid heating tubes of the associated steam generator, the tubes being provided on their furnace sides with studs and covered with refractory material, while on the outward sides they are covered with a layer of heat insulating material and a gas tight sheet metal casing.

The peripheral wall 3 of furnace chamber A is provided with tangentially arranged fuel inlet nozzles 7 connected to a suitable source of primary-air-entrained, finely granulated, solid, ash-bearing fuel, and with tangentially arranged air inlet nozzles 8 connected to a suitable source of secondary air. The rate of supply of fuel through nozzles 7 is regulable, by suitable known means, not shown, for example by control of the rate of supply of fuel to each nozzle or by variation in the number of the nozzles which are in use. The rate of supply of secondary air through nozzles 8 is likewise regulable.

Since the apex angle of the cone of end wall part 6a is 90°, the cone is coaxial with the cylindrical chamber A, and the axis of the chamber A is inclined at 45° to the horizontal, it follows that at its lowest position the generating line of the surface of wall part 6a is horizontal. The wall part 6a is formed at its lowest level with a slot-like slag discharge opening 9 which extends in the direction of the generating line of the cone in that bottom position. A refractory shaft 10 extends downwardly from the slag opening 9 and is provided at its lower end with a sheet metal extension 11 which dips into water contained in the trough 12 of a scraper conveyor 13 to provide an air-tight water seal.

A nozzle 14 extends from the gas outlet sleeve 5 of the cyclone furnace into a secondary combustion chamber B having a hopper-shaped lower end portion 16 which at its lowest level is formed with a slag outlet opening 17. A refractory shaft 18 extends downwardly from the opening 17 and is provided at its lower end with a sheet metal extension 19 which dips into the water contained in trough 12 to provide a gas-tight water seal. Alternatively the wall 4, which is common to both chamber A and chamber B, may be formed with a slag outlet opening (not shown) for the flow of molten slag from the lower end portion 16 of chamber B into the cyclone chamber A, for ultimate discharge of all slag through outlet 9 at the bottom of chamber A.

The nozzle 14 is directed into chamber B toward an inclined impact wall 20 of the chamber, which last named wall is provided with water heating tubes, as indicated. A slag screen of water cooled tubes 21 connected at their lower ends to an exterior header 22 extends across a gas outlet 23 from the upper end of the chamber B, with a lowermost row of the tubes 21 extending across the outlet 23 in line with the impact wall 20. Above the slag screen, the tubes 21 line one wall of an upper radiation chamber C with which the gas outlet 23 connects, while at their upper ends, the tubes 21 are connected to a steam and water drum 25 of the steam generating unit. The slag screen header 22 is connected by suitable downcomer means (not shown) with the water space of the upper drum 25.

The water space of drum 25 is connected by tubes 26 to the upper end of a large diameter vertical downcomer 27, the lower end of which is connected by tubes 28 to a horizontal header 29 disposed below the cyclone furnace 1. Tubes 30 connected to the header 29 are incorporated in the outer end wall 6, the peripheral wall 3, and the inner end wall 4, of the cyclone furnace 1. Certain of these tubes 30, suitably bent and arranged, are also incorporated in the sleeve 5 and the nozzle 14. Some of the tubes 30, in one, or in more than one cyclone wall, are continued as at 31 to cool the front upright wall of secondary combustion chamber B and radiation chamber C, while the remainder of tubes 30 are continued as at 32 to cool the floor, rear wall and impact wall 20 of secondary chamber B, and the upright rear wall of radiation chamber C. All the tubes 30 are connected at their upper ends so as to discharge to the drum 25. The side walls of both chamber B and chamber C also incorporate cooling tubes connected in suitable known manner into the circulatory system of the unit.

Disposed within the radiation chamber C are tube platens of a radiant superheater 35, and a convection superheater 36 is disposed within a lateral gas pass 37 leading from the upper end of radiation chamber C.

During operation of the combustion apparatus described above, granulated, ash-bearing solid fuel is supplied to the nozzle ports 7 entrained in a stream of primary air and is discharged tangentially into the cyclone furnace chamber A. By the use of those ports 7 which lie forwardly of the inner, inlet end of sleeve 5, fuel may be discharged into a fuel and air inlet zone of the chamber which is more remote from the end wall provided with the sleeve than the inward end of that sleeve. The burning fuel, the primary air, and secondary air which is supplied tangentially through an outer row of nozzles 8, are caused to whirl in the chamber A and pass toward the outlet sleeve 5. Ash deposited on the circumferential wall 3 of chamber A drains downwardly toward and through the slot-like opening 9 at the bottom. Since the gaseous pressure adjacent the peripheral wall 3 is higher than the pressure near the axis of chamber A, a rearward flow of hot products of combustion takes place over the curved wall part 6a towards the central wall part 6b, and some of these gases sweep along the slot 9, tending to maintain the slag passing therethrough in a suitably fluid state.

Hot products of combustion discharged into chamber B through nozzle 14 impinge upon the inclined impact wall 20, molten slag being deposited thereon and draining downwardly therealong to and through the slag outlet opening 17. If the cyclone end wall 4 is provided in its lower part with a slag outlet opening, the slag is discharged instead through that opening and drains downwardly to the cyclone slag outlet 9, being heated during its passage through the cyclone furnace chamber and thus maintained fluid.

The hot gaseous products of combustion striking the impact wall 20 are spread thereby to fill the secondary furnace chamber B, and then pass upwardly between the tubes 21 of the slag screen through the gas outlet 23 into the radiation chamber C, whence they flow through pass 37 over heat exchange surfaces of the steam generator to a suitable flue.

With the construction of cyclone furnace described, a large part of the slag deposited on the peripheral wall 3 will drain vertically onto the lower part of the frusto-conical wall part 6a. The slot-like slag outlet 9 is subject to a longitudinal flow of hot gases which tends to prevent slag solidification, which last named condition is the cause of slag accumulations. Also, provided that, as shown, the end of outlet 9 is spaced, axially of the cyclone furnace, from the cylindrical wall 3, the gas pressure at the slag outlet is less than that at the periphery of the cylindrical chamber portion, thus facilitating the provision of a water seal at the slag outlet. Although a component of the gravitational force on the fuel particles does act axially of the cyclone furnace, it is only 0.7 of the axial force which would act on the particles if the axis of the cyclone furnace were vertical. Moreover, the component of the gravitational force which acts transversely across the cyclone furnace, and which brings about the periodic acceleration and retardation of the fuel particles whirling therein, is also reduced to 0.7 of that experienced in a cyclone furnace having a horizontal axis.

While in accordance with the provisions of the statutes there is illustrated and described herein the best form of the invention now known to me, those skilled in the art will understand that changes may be made in the form of the apparatus disclosed without departing from the spirit of the invention covered by the claims, and that certain features of the invention may sometimes be used to advantage without a corresponding use of other features.

I claim:

1. Apparatus for burning a slag-forming solid fuel which comprises walls forming a substantially cylindrical furnace chamber arranged with its major axis forwardly inclined at an angle to the horizontal of close to 45° and having a frusto-conical extension at the rear end thereof, said walls including an inner exposed refractory surface and fluid heating tubes proportioned for the maintenance of said refractory surface under a normal mean temperature in said furnace chamber above the fuel ash fusion temperature, said frusto-conical extension having a slag outlet extending through the lowermost portion thereof for removing molten slag separated from the gases flowing through said furnace chamber, means defining a gas outlet throat projecting into the forward end of said furnace chamber, and means for introducing combustion air and slag-forming solid fuel tangentially into said chamber and effecting a helical path of travel therein along the circumferential wall of said chamber toward and in sweeping relation with said slag outlet, said frusto-conical extension being arranged to reverse the path of flow of the whirling burning gases in the direction of said gas outlet.

2. Apparatus for burning a slag-forming solid fuel which comprises walls forming a substantially cylindrical furnace chamber arranged with its major axis forwardly inclined at a 45° angle to the horizontal and having a frusto-conical extension at the rear end thereof, said walls including an inner exposed refractory surface and fluid heating tubes proportioned for the maintenance of said refractory surface under a normal mean temperature in said furnace chamber above the fuel ash fusion temperature, said frusto-conical extension having a slag outlet extending through the lowermost portion thereof for removing molten slag separated from the gases flowing through said furnace chamber, means defining a gas outlet throat projecting into the forward end of said furnace chamber, and means including a plurality of ports at spaced positions along the length of said furnace chamber arranged substantially tangentially to the circumferential wall thereof for introducing combustion air and slag-forming solid fuel into said chamber and effecting a helical path of travel therein along the circumferential wall of said chamber toward and in sweeping relation with said slag outlet, said frusto-conical extension being arranged to reverse the path of flow of the whirling burning gases toward the axis of said chamber and in the direction of said gas outlet.

3. Apparatus for burning a slag-forming solid fuel which comprises walls forming a substantially cylindrical furnace chamber arranged with its major axis forwardly inclined at an angle to the horizontal of close to 45° and having a frusto-conical extension at the rear end thereof, said walls including an inner exposed refractory surface and fluid heating tubes proportioned for the maintenance of said refractory surface under a normal mean temperature in said furnace chamber above the fuel ash fusion temperature, the fluid heating tubes of the circumferential wall of said furnace chamber and said frusto-conical extension extending longitudinally thereof, said frusto-conical extension having a slag outlet extending through the lowermost portion thereof for removing molten slag separated from gases flowing through said furnace chamber, means defining a gas outlet throat projecting into the forward end of said furnace chamber, and means for introducing combustion air and slag-forming solid fuel tangentially into said chamber and effecting a helical path of travel therein along the circumferential wall of said chamber toward and in sweeping relation with said slag outlet, said frusto-conical extension being arranged to reverse the path of flow of the whirling burning gases in the direction of said gas outlet.

4. Apparatus for burning a slag-forming solid fuel which comprises walls forming a substantially cylindrical furnace chamber arranged with its major axis forwardly inclined at an angle to the horizontal of close to 45° and having a frusto-conical extension at the rear end thereof, said walls including an inner exposed refractory surface and fluid heating tubes proportioned for the maintenance of said refractory surface under a normal mean temperature in said furnace chamber above the fuel ash fusion temperature, each of the fluid heating tubes of the circumferential wall of said furnace chamber and said frusto-conical extension extending longitudinally thereof, said frusto-conical extension having a slag outlet extending through the lowermost portion thereof for removing molten slag separated from the gases flowing through said furnace chamber, means defining a gas outlet throat projecting into the forward end of said furnace chamber, means for introducing combustion air and slag-forming solid fuel tangentially into said chamber and effecting a helical path of travel therein along the circumferential wall of said chamber toward and in sweeping relation with said slag outlet, said frusto-conical extension being arranged to reverse the path of flow of the whirling burning gases in the direction of said gas outlet, walls defining a vertically extending secondary furnace chamber arranged laterally adjacent to said furnace chamber and opening to said gas outlet, some of the fluid heating tubes of the circumferential wall of said furnace chamber being extended to line an upwardly extending wall of said secondary furnace disposed opposite said gas outlet and arranged to receive the impact of the slag particles in suspension in the gases discharged from said furnace chamber, and a slag outlet from said secondary furnace chamber.

References Cited in the file of this patent

UNITED STATES PATENTS 1,926,637    Suffern _____ Sept. 12, 1933

FOREIGN PATENTS 675,410    Great Britain _____ July 9, 1952
706,504    Great Britain _____ Mar. 31, 1954